(12) United States Patent
Wilson et al.

(10) Patent No.: US 7,703,566 B2
(45) Date of Patent: Apr. 27, 2010

(54) INTEGRATED AUTOMOTIVE TIE BAR AND UPPER CONDENSER, RADIATOR AND FAN MODULE BRACKETS

(75) Inventors: Bryan D. Wilson, Warren, MI (US); Daniel G. Tolan, Ortonville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1013 days.

(21) Appl. No.: 11/419,208

(22) Filed: May 19, 2006

(65) Prior Publication Data

US 2007/0267236 A1 Nov. 22, 2007

(51) Int. Cl.
*B60K 11/04* (2006.01)

(52) U.S. Cl. ................ 180/68.4; 180/295; 180/299

(58) Field of Classification Search ............. 180/68.1, 180/68.2, 68.4, 68.6; 296/191, 192, 193.09, 296/193.1, 193.11
See application file for complete search history.

(56) References Cited

U.S. PATENT DOCUMENTS

| | | | | |
|---|---|---|---|---|
| 3,121,467 | A * | 2/1964 | Bryant | 180/68.4 |
| 3,929,201 | A * | 12/1975 | Hoffman | 180/68.4 |
| 4,564,168 | A * | 1/1986 | Ikuta et al. | 248/638 |
| 4,979,584 | A * | 12/1990 | Charles | 180/68.1 |
| 5,626,202 | A * | 5/1997 | Barnes et al. | 180/68.1 |
| 5,875,836 | A * | 3/1999 | Nakamura | 165/122 |
| 5,996,684 | A | 12/1999 | Clifton et al. | |
| 6,364,403 | B1 * | 4/2002 | Ozawa et al. | 296/187.09 |
| 6,408,933 | B2 * | 6/2002 | Fukuoka et al. | 165/67 |
| 6,457,543 | B1 * | 10/2002 | Wooldridge | 180/68.4 |
| 6,543,525 | B2 * | 4/2003 | Kalbacher | 165/140 |
| 6,571,898 | B2 * | 6/2003 | Guyomard | 180/68.4 |
| 6,676,179 | B2 * | 1/2004 | Sato et al. | 293/115 |
| 6,789,606 | B2 * | 9/2004 | Ohki | 165/41 |
| 7,117,926 | B2 * | 10/2006 | Mori et al. | 165/67 |
| 7,150,335 | B2 * | 12/2006 | Sasano et al. | 180/68.4 |
| 7,287,613 | B2 * | 10/2007 | Kim | 180/68.4 |
| 7,331,413 | B2 * | 2/2008 | Okai et al. | 180/68.4 |
| 2002/0038700 | A1 * | 4/2002 | Gille | 165/140 |
| 2003/0062148 | A1 * | 4/2003 | Ohki | 165/41 |
| 2006/0207815 | A1 * | 9/2006 | Vandekerkhof | 180/68.4 |
| 2006/0225933 | A1 * | 10/2006 | Kwun et al. | 180/68.6 |
| 2006/0237175 | A1 * | 10/2006 | Hara | 165/140 |

FOREIGN PATENT DOCUMENTS

| | | |
|---|---|---|
| JP | 200025466 | 1/2000 |
| JP | 2003130578 | 5/2003 |
| JP | 2003320856 | 11/2003 |

* cited by examiner

*Primary Examiner*—Lesley Morris
*Assistant Examiner*—Vaughn T Coolman

(57) ABSTRACT

An upper CRFM attachment modality which provides assembly simplification, structural strength, design efficiency, and reduced vehicle weight. The tie bar, particularly the inner tie bar component thereof, is integrally provided with a pair of upper CFRM brackets. A pair of elastomeric frustoconical studs are attached to the top end of the upper CRFM, wherein the frustoconical studs self-aligningly interface, respectively, with a stud hole of each of the upper CRFM brackets as a powertrain cradle carrying the CRFM is lifted toward the engine compartment.

1 Claim, 4 Drawing Sheets

INTEGRATED AUTOMOTIVE TIE BAR AND UPPER CONDENSER, RADIATOR AND FAN MODULE BRACKETS

TECHNICAL FIELD

The present invention relates to automotive structures; more particularly, the tie bar and the upper bracketing for securing a condenser, radiator and fan module (CRFM) thereto. More particularly, the present invention relates to an integrated tie bar and upper brackets for securing the CRFM thereto.

BACKGROUND OF THE INVENTION

In the automotive arts, it is common practice during the assembly process of a motor vehicle to pre-assemble the drive train (i.e., engine and transmission) and the condenser, radiator and fan module (CRFM) with respect to a powertrain cradle. The installation of the powertrain and CRFM is then accomplished by the powertrain cradle being aligned and lifted to the motor vehicle frame and then bolted thereto. Among other assembly operations which complete the installation, a pair of upper brackets are bolted to the tie bar and the CRFM.

Referring to FIGS. 1 and 1A, the tie bar 10 is a frame member which spans laterally between the left and right sides of the uppermost portion of the front of the engine compartment of a motor vehicle. Conventionally, the tie bar 10 has an inner tie bar component 12 and an outer tie bar component 14 which are mutually interconnected, as for example by welding. The CRFM 16 is conventionally attached to the powertrain cradle by threaded fasteners at the lower CRFM (not visible in FIGS. 1 and 1A, but indicated at FIGS. 5A and 5B). At the top end 16T of the upper CRFM 16U, a pair of upper CRFM attachment brackets 18, 20, having a generally Z-shape, are secured at a first end 18a, 20a, respectively, to the tie bar 10, and at a second end 18b, 20b, respectively, to the top end 16T of the upper CRFM 16U. In this regard, and as best illustrated by FIG. 1A, an elastomeric grommet 22 is located in a hole 24 of each of the second ends 18b, 20b, and an upstanding stud 26, 28 of the CRFM 16 is received into a respective grommet 22.

What remains needed in the art is to somehow replace the upper brackets mounting modality with an improved attachment modality which provides assembly simplification, structural strength and design efficiency, and reduced vehicle weight.

SUMMARY OF THE INVENTION

The present invention is an upper CRFM attachment modality which provides assembly simplification, structural strength, design efficiency, and reduced vehicle weight.

The upper CRFM attachment modality according to the present invention is an integration of the tie bar with a pair of upper CFRM brackets. In this regard in a preferable form, the inner tie bar component of the tie bar has integrally formed therewith a pair of upper CFRM brackets. An additional feature of the present invention preferably includes a pair of frustoconical studs, preferably elastomeric, which are attached to the top end of the upper CRFM, wherein the frustoconical studs self-aligningly interface, respectively, with a stud hole of each of the CRFM brackets as the CRFM is lifted toward the tie bar during installation.

In operation, a tie bar is fabricated having a pair of upper CRFM brackets integrally formed therewith, as for preferable example an inner tie bar component thereof integrally carrying a plurality, preferably a pair, of upper CRFM brackets, each upper CRFM bracket having a respective stud hole. Further, the CRFM is fabricated with a plurality of frustoconical studs, one for each upper CRFM bracket, located at the top end of the upper CRFM, preferably composed of an elastomer, most preferably rubber. The CRFM is conventionally attached to the powertrain cradle by threaded fasteners at the lower CRFM. As the powertrain cradle is conventionally raised, and then attached, to the motor vehicle frame at the engine compartment, the frustoconical studs self-align into the stud holes of the upper CRFM brackets. Upon completion of attachment of the powertrain cradle to the motor vehicle frame, the frustoconical studs are now automatically held fast at the stud holes of the upper CRFM brackets, without need of any fasteners.

Accordingly, it is an object of the present invention to provide an upper CRFM attachment modality for a CRFM, wherein the tie bar has integrated upper CRFM brackets which self-aligningly interface with frustoconical studs of the CRFM.

DESCRIPTION OF THE PREFERRED EMBODIMENT

Figure 1:
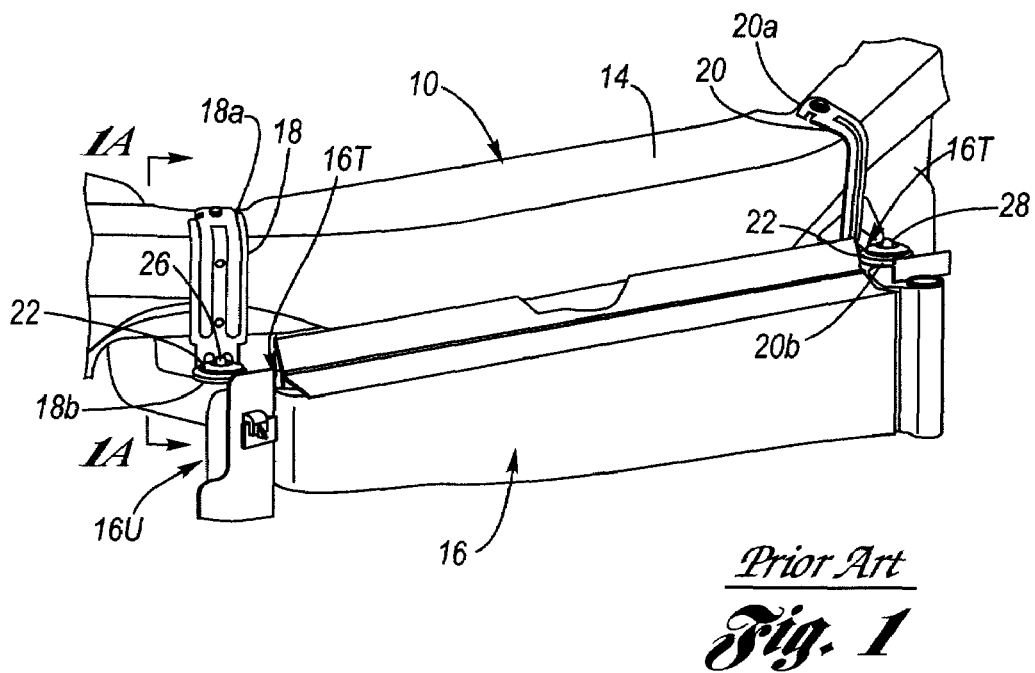
FIG. 1 is a perspective view of a portion of the tie bar and CRFM of a motor vehicle, wherein conventional upper brackets are utilized to attach the upper CRFM to the tie bar.

Referring now to the Drawing, FIGS. 2 through 5B depict an example of an upper CRFM attachment modality 100 according to the present invention for automatically attaching the upper CRFM 102U of a CRFM 102 to an inner tie bar component 104a as the powertrain cradle 106 (see FIGS. 5A and 5B) is conventionally lifted, and thereupon connected, to the frame of a motor vehicle.

The upper CRFM attachment modality 100 includes an integration of the inner tie bar component 104a with a pair of upper CFRM brackets 108a, 108b. While the tie bar may be constructed in a variety of configurations, any configuration of which having the integrated upper CRFM brackets, it is preferred to utilize (see FIG. 3) a two component tie bar 104 having an inner tie bar component 104a and an outer tie bar component 104b, which are mutually connected, as for example by welding. In this preferred configuration of a tie bar 104, the inner tie bar component 104a has integrally formed therewith the pair of CFRM brackets 108a, 108b.

It is preferred for each of the upper CRFM brackets 108a, 108b to be formed directly of the inner tie bar component 104a via a respective flat land 108c formed of the inner tie bar component, itself. Each of the upper CRFM brackets 108a, 108b has a stud hole 110, wherein it is preferred for the perimeter 110p thereof to be characterized by an upturned rim 110r.

Figure 3:
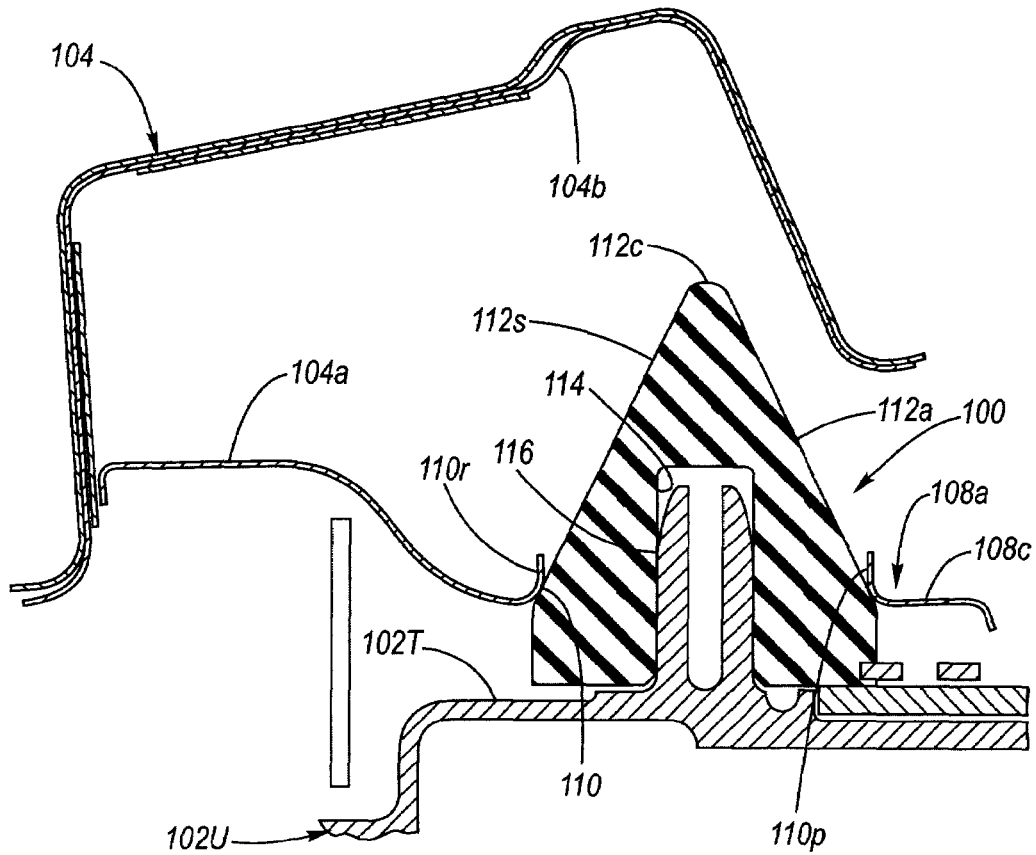
FIG. 3 is a sectional view, showing a frustoconical stud of the upper CRFM bracketably interfaced with an inner tie bar component of the tie bar according to the present invention.
Figure 4:
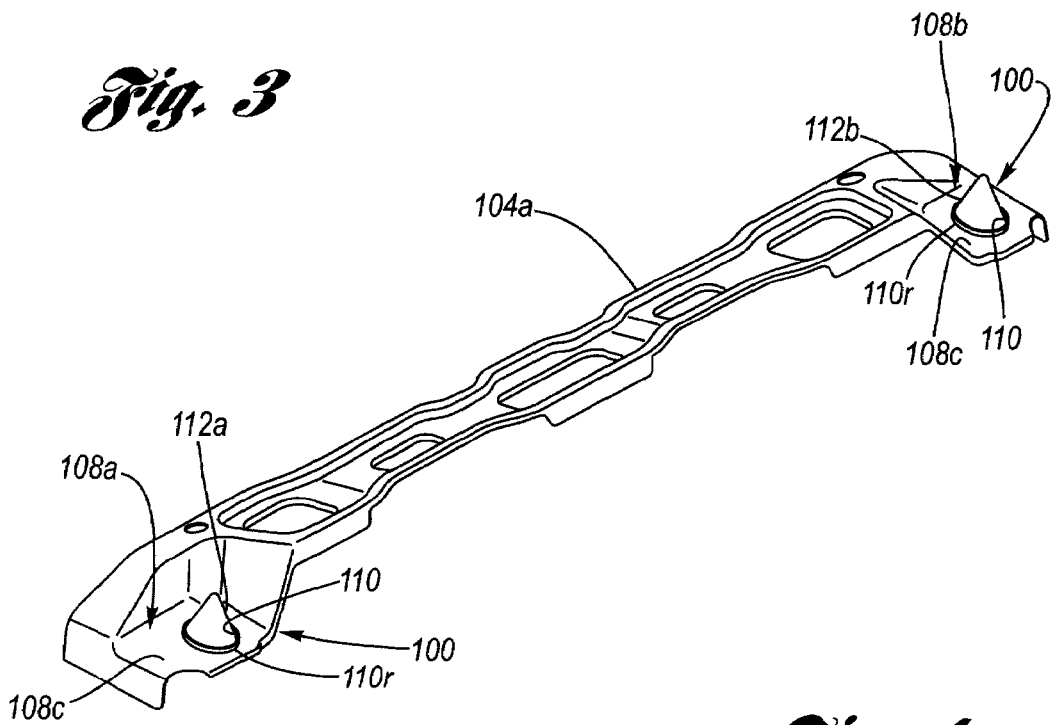
FIG. 4 is a perspective view of the inner tie bar component with integrated upper CRFM brackets, shown interfaced with frustoconical studs of the upper CRFM according to the present invention.

The upper CRFM attachment modality 100 further includes a pair of frustoconical studs 112a, 112b which are attached to the top end 102T of the upper CRFM 102U. A preferred material for the frustoconical studs 112a, 112b, is an elastomer, most preferably rubber. As shown at FIG. 3, the frustoconical studs 112a, 112b are connected to the top end 102T of the upper CRFM 102U via, by way of preference, a blind bore 114 thereof tightly receiving a slotted mounting finger 116 affixed to the top end 102T.

The shape of the frustoconical studs and of the upstanding rim 110r of the stud holes are cooperatively configured, and the spacing between the stud holes matches the spacing between the frustoconical studs, so that lifting of the CRFM will result in self-alignment of the frustoconical studs with respect to the stud holes, whereupon each of the frustoconical studs will automatically seat into its respective stud hole, as will be further discussed hereinbelow.

Figure 1A:
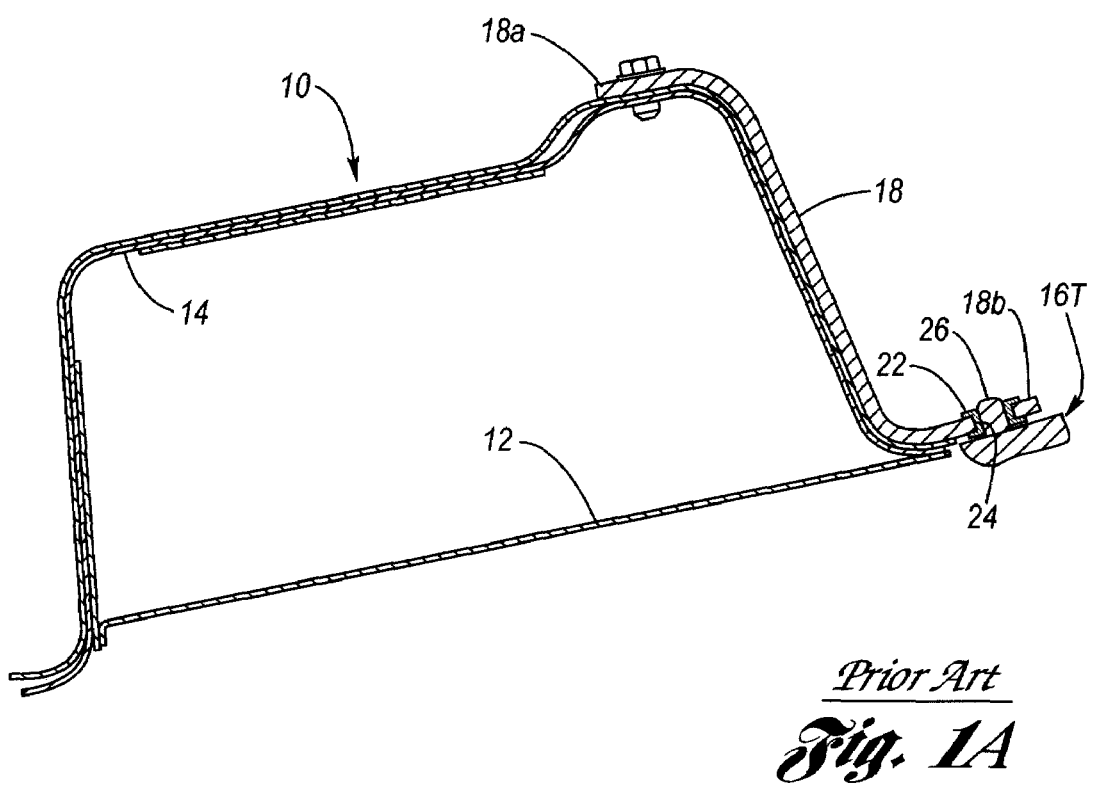
FIG. 1A is a sectional view, seen along line 1A-1A of FIG. 1.
Figure 2:
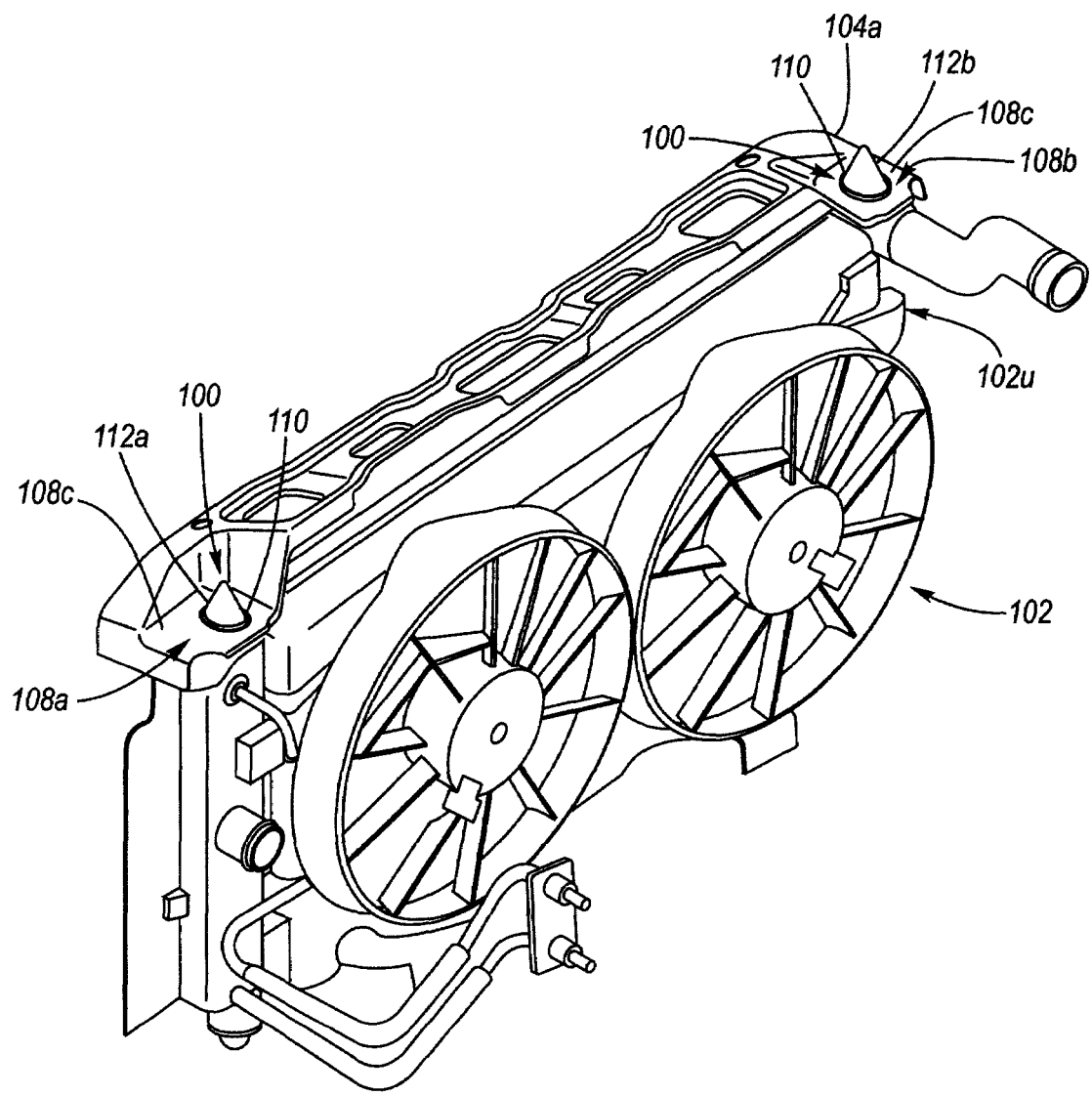
FIG. 2 is a perspective view of an inner tie bar component and CRFM of a motor vehicle, both according to the present invention.

It is desired to have an elastomer-metal interface between the frustoconical studs 112a, 112b and the perimeter of the stud holes 110, and in this regard the frustoconical studs are preferably composed of an elastomer (preferably rubber, as mentioned) and the perimeter of the stud holes is the metal of the tie bar. However, this could be achieved, but with lesser desirability, by the stud holes being provided with a grommet (as for example analogous to the elastomeric grommet 22 shown at FIG. 1A), in which case the frustoconical stud could then be composed of a metal or hard plastic material.

Figure 5A:
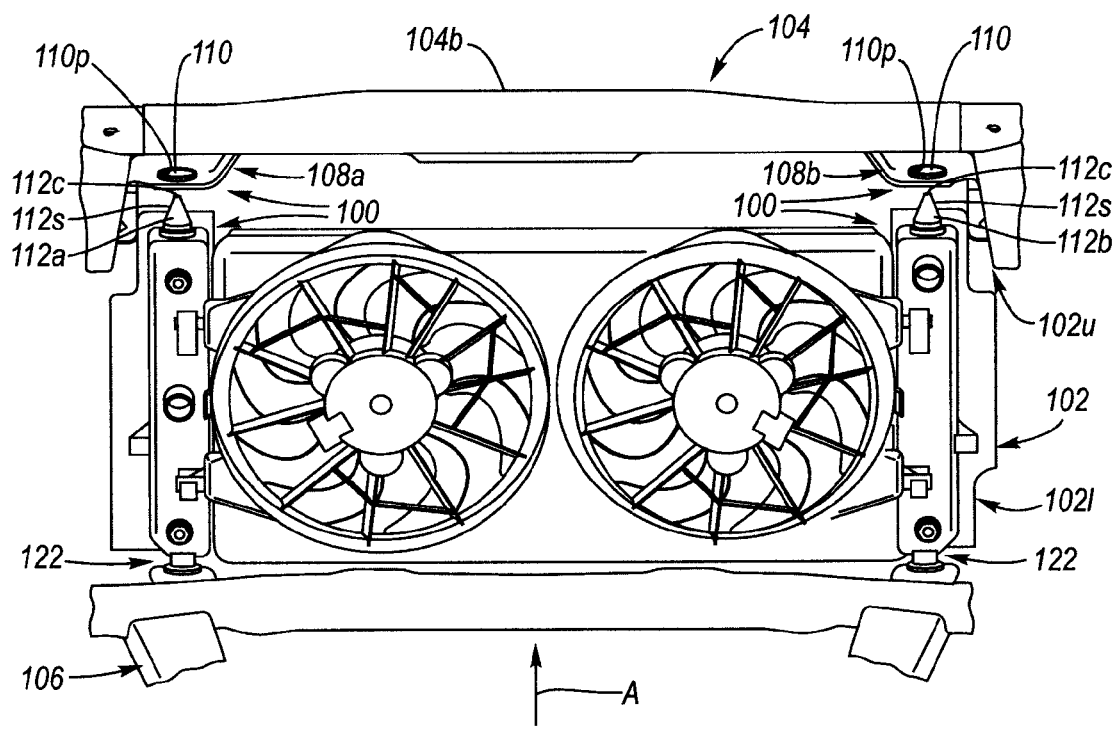
FIGS. 5A and 5B are front end views of a tie bar with integrated upper CRFM brackets and CRFM with frustoconical studs according to the present invention, shown, respectively, in a medial initial state of installation and a final state of installation.
Figure 5B:
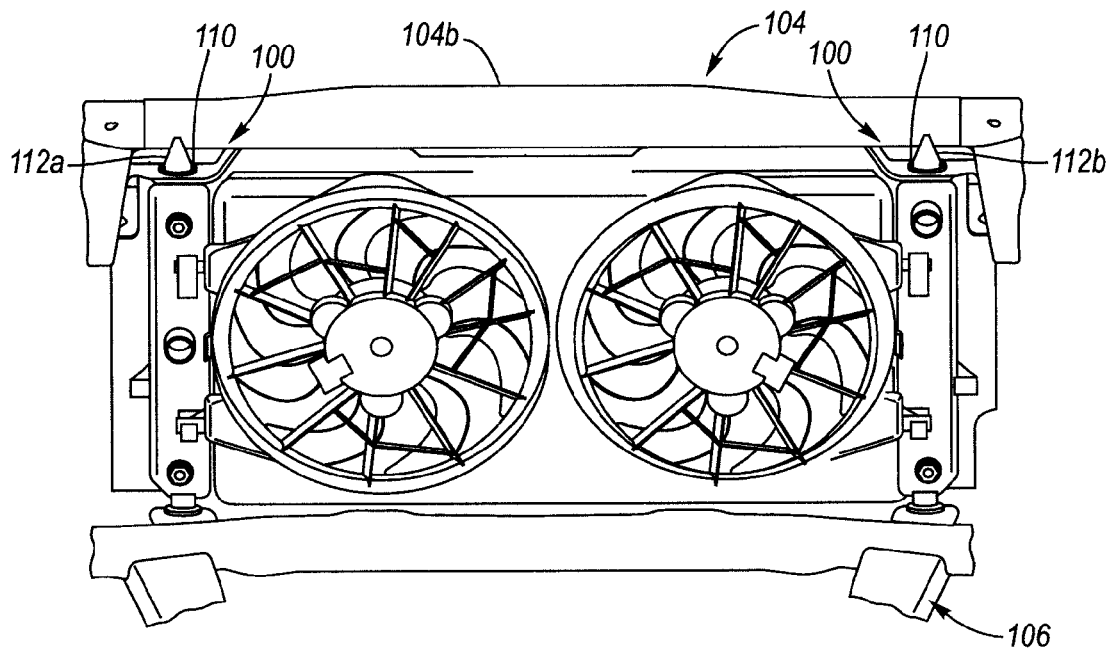

Turning attention now additionally to FIGS. 5A and 5B, operation of the upper CRFM attachment modality 100 according to the present invention will be detailed.

The tie bar 104 is fabricated having a pair of upper CRFM brackets integrally formed therewith. In the most preferred example of operation, the tie bar 104 is a two component tie bar having an inner tie bar component 104a and an outer tie bar component 104b welded thereto, and wherein the inner tie bar component integrally carries the pair of upper CRFM brackets 108a, 108b. The tie bar is then installed in the motor vehicle at the front of the engine compartment, behind the front grill.

The CRFM 102 is fabricated, and includes the pair of elastomeric frustoconical studs 112a, 112b, both being located at the top end thereof and located for being received into the stud holes of the upper CFM brackets. The CRFM is conventionally attached to the powertrain cradle 106 by conventional threaded fastener attachments 122 at the lower CRFM 102L.

The powertrain cradle 106 is positioned beneath the engine compartment of the motor vehicle, and thereupon lifted along arrow A toward the engine compartment. As shown at FIG. 5A, as the powertrain cradle is raised, the frustoconical studs align under the stud holes 110, wherein the conic shape of the frustoconical studs, including a pointed apex 112c, allows for a range of misalignment with yet the apex being receivable into each respective stud hole, whereby it is understood that in the case of such a misalignment, the frustoconical studs self-align by sliding along the frustoconical surface 112S thereof seatingly into the stud holes as the CRFM is further raised.

Upon completion of the lifting of the powertrain cradle, the powertrain cradle is attached to the motor vehicle frame in the conventional manner. Now, as shown at FIG. 5B, the frustonical studs have automatically seated with respect to, and held fast by, the perimeters 110p of the stud holes 110, being now snuggly received into the stud holes of the upper CRFM brackets.

The upper CFRM attachment modality according to the present invention offers a number of significant advantages, including cost savings, fewer parts and reduced vehicular weight; an error-proof and automatic installation; and an upper CRFM connection which is robust, and provides a high structural performance.

A significant advantage of the upper CRFM attachment modality is that since the upper CFRM brackets are integrated with the tie bar, particularly the inner tie bar component, it is now possible to configure the tie bar more optimally, as for example moving it forward so that the tie bar gussets used for locking closed the hood are better located and more capable of absorbing hood slam loads.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for attaching a condenser, radiator and fan module to a motor vehicle, comprising the steps of:
   attaching a pair of frustoconical studs to a top end of the condenser, radiator and fan module;
   providing a tie bar having a pair of brackets, each bracket having a stud hole, each stud hole being configured for receiving therein a respective frustoconical stud;
   attaching a lower end of the condenser, radiator and fan module to a powertrain cradle;
   positioning the powertrain cradle beneath an engine compartment of the motor vehicle;
   lifting the powertrain cradle toward the engine compartment; and
   attaching the powertrain cradle to the motor vehicle upon completion of said step of lifting;
   wherein during said step of lifting, each of the frustoconical studs is automatically seated into its respective stud hole such that upon the completion of said step of lifting, the top end of the condenser, radiator and fan module is affixed with respect to the tie bar.

* * * * *